United States Patent [19]

Miyagi et al.

[11] Patent Number: 5,461,607
[45] Date of Patent: Oct. 24, 1995

[54] ATM COMMUNICATION APPARATUS AND FAILURE DETECTION AND NOTIFICATION CIRCUIT

[75] Inventors: Morihito Miyagi, Tokyo; Yutaka Ito; Kenichi Oka, both of Yokohama; Yasushi Takagi, Kunitachi, all of Japan

[73] Assignees: Hitachi, Ltd.; Nippon Telegraph and Telephone Corporation, both of Tokyo, Japan

[21] Appl. No.: 251,784

[22] Filed: May 31, 1994

[30] Foreign Application Priority Data

May 31, 1993 [JP] Japan ................................. 5-128699

[51] Int. Cl.$^6$ .................................................. H04J 1/16
[52] U.S. Cl. ..................................... 370/16; 370/94.1
[58] Field of Search ........................... 370/16, 60, 94.1; 340/827; 371/8.1, 8.2, 11.1, 11.2, 24, 20.4

[56] References Cited

U.S. PATENT DOCUMENTS

5,185,743  2/1993  Murayama et al. ...................... 370/60
5,313,453  5/1994  Uchida et al. ............................ 370/60
5,339,310  8/1994  Taniguchi ................................. 370/60

Primary Examiner—Douglas W. Olms
Assistant Examiner—Dang Ton
Attorney, Agent, or Firm—Antonelli, Terry, Stout & Kraus

[57] ABSTRACT

In an ATM communication apparatus, the same failure detection process is conducted for the detection of a failure state of a VP when a transmission line of the apparatus fails and the detection of the failure state of the VP when a VP-AIS cell generated by another apparatus is received. When an AIS cell generation unit receives a channel failure signal generated by a line terminator, it generates an AIS cell and inserts it in a receiving cell stream. A circuit provided at downstream of the cell stream copies or extracts the AIS cells, determines the failure state, generates a FERF cell in accordance with the determination, and inserts it in a sending cell stream.

6 Claims, 6 Drawing Sheets

201: LINE / CONNECTION
202: UPPER LEVEL CONNECTION
203: UPPER LEVEL CONNECTION

FIG. 3

501: SDH LINE
502: VP1
503: VP2
504: VP3
505: VP4

FIG. 5A

606: VP TABLE-1

|     |   |
|-----|---|
| VP1 | 1 |
| VP2 | 1 |
| VP3 | 1 |
| VP4 | 1 |

609: VP ENABLE/DISABLE
O: DISABLE
1: ENABLE

FIG. 5B

623: VP TABLE-2

|     |   |   |   |
|-----|---|---|---|
| VP1 | O |   |   |
| VP2 | O |   |   |
| VP3 | 1 |   |   |
| VP4 | 1 |   |   |

620: MONITOR/DROP
O: DROP
1: MONITOR

FIG. 6A

108: VP AIS CELL

632 — FAULT VPI — HEADER
633 — OAM TYPE AND FUNCTION TYPE
634 — FAILURE INFORMATION — PAYLOAD

FIG. 6B

109: VP FERF CELL

635 — REVERSE DIRECTION VPI — HEADER
636 — OAM TYPE AND FUNCTION TYPE
637 — FAILURE INFORMATION — PAYLOAD

FIG. 7

○: GENERATION  ●: DETECTION  ⊗: ALARM CELL MONITOR
LOS: SIGNAL DISABLED (LOSS OF SIGNAL),
AIS: ALARM INDICATION SIGNAL, FERF: FAR END
RECEIVE FAILURE *: SENT OUT FOR ALL FAILURE VPs

ATM COMMUNICATION APPARATUS AND FAILURE DETECTION AND NOTIFICATION CIRCUIT

BACKGROUND OF THE INVENTION

The present invention relates to a communication apparatus which uses an Asynchronous Transfer Mode (ATM) communication system, and an exchange or terminal equipment for terminating a line or a connection in an ATM network, and more particularly to a failure detection and notification apparatus provided at a line interface of such apparatus.

As disclosed in an article "Virtual Path OAM Functions for Broad-band ATM Networks", Kanayama et al, Technical Journal of Society of Electronic Engineering and Communication, CS91–92, when a transmission line failure occurs in an ATM network, all Virtual Paths (VPs) on the transmission line fail. As a result, it is necessary to make a failure notification to all users of the failed VPs (ATM exchanges, terminal equipments) to rapidly conduct the stop of charge in the exchanges, the disabling of the lines and the switching at the VP level.

Since all information are transferred by cells on the VP, a previously defined alarm indication cell is transferred to notify of the occurrence of a failure.

An ATM transfer device such as a cross connect (XC) has a VP routing table (VPI (Virtual Path Identifier) conversion table) for VPs accommodated in each transmission line, and a failure VP number can be easily identified by using the table so that an alarm indication cell can be rapidly transferred to the failed VP.

Figure 7:
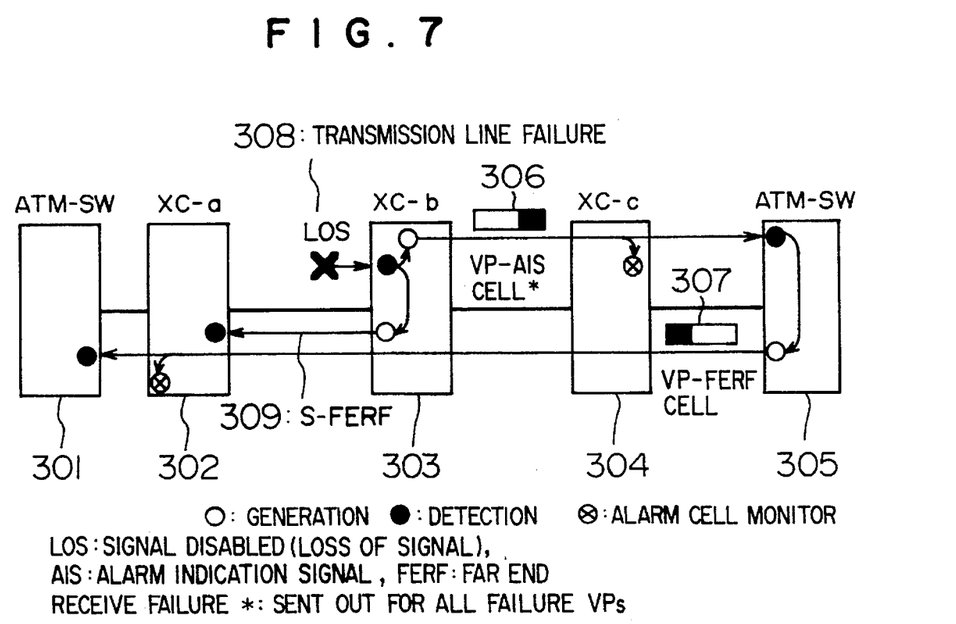
FIG. 7 illustrates a failure detection and notification method (alarm transfer method) in a prior art ATM communication system.

Referring to FIG. 7 which is quoted from the above-mentioned article, an example of a sequence of an alarm transfer is explained. In FIG. 7, numeral 301 denotes an ATM-SW (ATM exchange), numeral 302 denotes an XC-a (cross connect), numeral 303 denotes an XC-b, numeral 304 denotes an XC-c, numeral 305 denotes an other ATM-SW, numeral 306 denotes a VP alarm indication signal (AIS) cell, numeral 307 denotes a VP-far end receive failure (FERF) cell, numeral 308 denotes a transmission line failure and numeral 309 denotesan S-FERF (Section-FERF).

When the XC-b 303 detects the transmission line failure 308, it sends out the section failure signal S-FERF 309 to the XC-a 302, and determines the VPs accommodated in the failed transmission line using the VP routing table. The VPI number of the failed VP is set in the VPI field of the VP-AIS (Virtual Path-Alarm Indication Signal) cell 306 so that the VP-AIS cell 306 is routed in the network as is user cells and transferred to the end point. Information, a type of failure and a location of failure, is written into a payload of the VP-AIS cell 306 by the failure detection circuit of XC-b 303.

Thus, when the ATM-SW 305 detects the VP-AIS cell 306, it can localize the failure. When the end point device ATM-SW 305 receives the VP-AIS cell 306, it sends out the alarm indication cell (VP-FERF cell 307) which notifies the failure of the VP in the sending side so that the failure of the sending VP may be detected at a far end point of VP, the ATM-SW 301.

In the detection of the VP-AIS state, rapidness and sufficient reliability to the failure detection are required. In order to prevent the VP-AIS cells from disturbing the transfer of user cells, the bandwidth of the VP-AIS cells to be transmitted is limited and the VP-AIS cells are periodically sent out. This is defined in the CCITT Recommendation (Recommendation I.610:B-ISDN Operation and Maintenance Principles and Functions).

Figure 8:
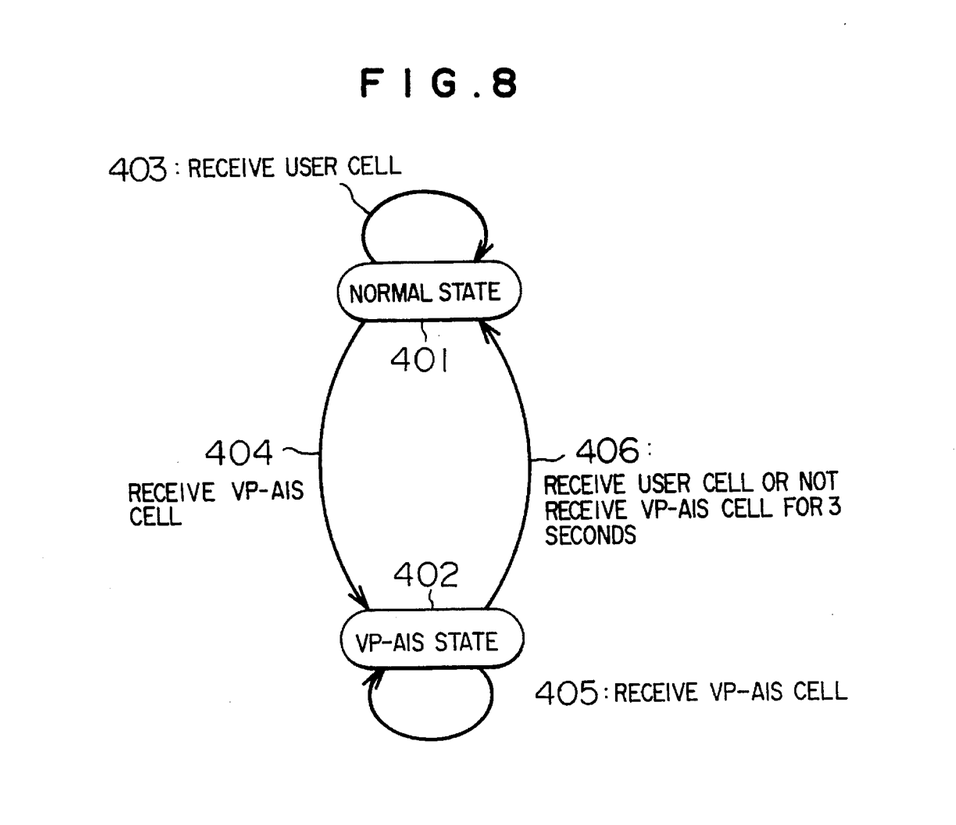
FIG. 8 illustrates a state transition of a connection in the communication apparatus by detecting a failure state of the VP.

The VP of the communication apparatus shifts the state as shown in a state transition diagram of FIG. 8 when it receives the VP-AIS cell. Numeral 401 denotes a normal state of the VP and numeral 402 denotes the VP-AIS state. The number of VP-AIS cells required for the failure detection is "1". Thus, in the normal state, by receiving one VP-AIS cell (VP-AIS cell reception 404), the state is changed to the VP-AIS state 402.

Figure 9A:
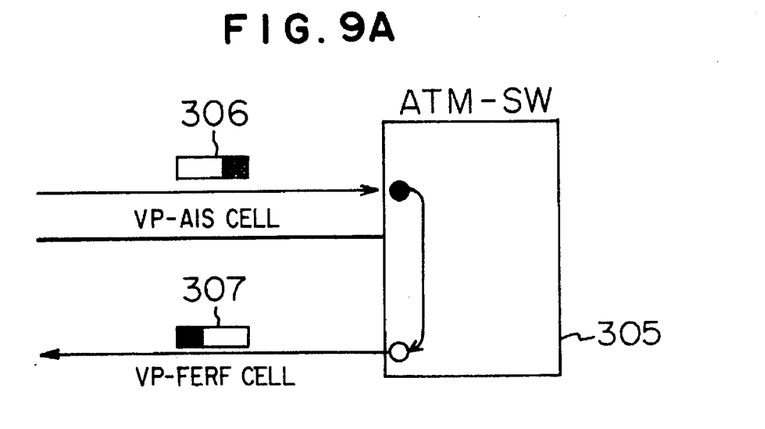
FIGS. 9A, 9B and 9C illustrate problems in the prior art system due to the state transition.

FIG. 9A shows a case of a transmission line failure in other apparatus. The ATM-SW 305 operates in the following manner. (1) It detects the VP-AIS cell 306 sent from other communication apparatus (e.g. XC-b 303 of FIG. 7) (2) It sets the VP having detected the VP-AIS cell thereof to "VP-AIS state" in accordance with the state transition diagram shown in FIG. 8. (3) It prepares the VP-FERF cell 307 and sends it to the far end VP end point.

Figure 9B:
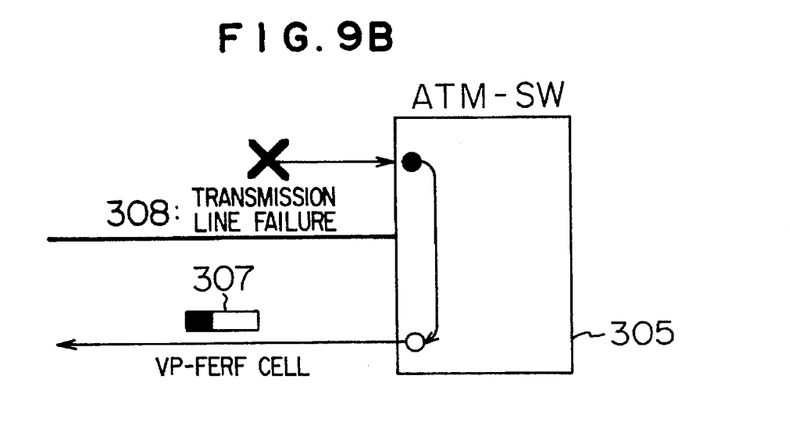

FIG. 9B shows a case of a transmission line failure in its own apparatus. The ATM-SW 305 operates in the following manner. (1) It detects the transmission line failure. The transmission line interface in the ATM-SW has a function to monitor the power of the signals and the synchronization status of the signals, and when it detects a drop in the signal power or a out-of-synchronization status, it sends out a failure signal to the failure detection unit of the ATM-SW through a separate signal line. (2) It determines the VPs accommodated in the failure transmission line using the routing table in the same manner as the XC-b 303 detects the transmission line failure. It sets all VPs accommodated in the failure transmission line to the "VP-AIS state" as long as the transmission line stays in the failure state. (3) When the VP is terminated at the ATM-SW, it prepares the VP-FERF cell 307 and sends it to the far end VP.

Figure 9C:
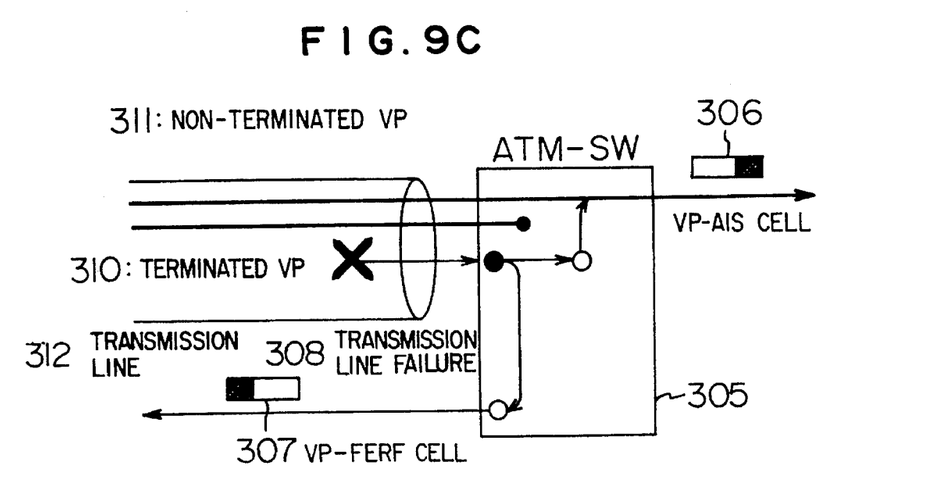

FIG. 9C shows a case where the transmission line failure is in its own apparatus and the failure transmission line 312 accommodates the VP 310 which is terminated by the ATM-SW and the VP 311 which is not terminated by the ATM-SW. The state transition of the failure detection is same as (1) and (2) of FIG. 9B. The ATM-SW 305 prepares the VP-AIS cell 306 for the non-terminated VP 311 and sends it downward. On the other hand, it prepares the VP-FERF cell 307 for the terminated VP 310 as is the case of FIG. 9B and sends it to the far end VP end point.

As shown in FIGS. 9A, 9B and 9C, there are two cases for the operation of the ATM-SW. Namely, (1) It detects the failure state of the VPs accommodated in the transmission line of its own apparatus when it fails. (2) It detects the failure state of the VP having the VP-AIS cell thereof sent out when the transmission line of another apparatus fails.

In the case (1), the transmission line (section) failure is signaled from the transmission line interface through the separate signal line, and in the case (2), the transmission line failure is signaled by the VP-AIS cell. Thus, two different signals are inputted to set the VP to the same failure state.

Further, if a transmission line failure occurs in the transmission line of its own apparatus when a VP is in the VP-AIS state in the state transition diagram of FIG. 8 by the transmission line failure of the other apparatus, no external cell is inputted because of the transmission line failure of its own apparatus and hence no VP-AIS cell is inputted. In this case, "VP-AIS cell not received for 3 seconds" 406 is indicated and the state is shifted to the normal state in accordance with the state transition diagram of FIG. 8. Since the transmission line failure has occurred in its own apparatus, the corresponding VPs should be kept in the failure state but in this case, the VP-AIS state is released.

SUMMARY OF THE INVENTION

It is an object of the present invention to unify a section failure signal for a transmission line failure in its own apparatus of an ATM communication apparatus and a transmission line failure of a transmission line of another ATM communication apparatus.

It is another object of the present invention to keep a correct state transition in the ATM communication apparatus even if a transmission line failure occurs in its own apparatus in addition to a transmission line failure in another apparatus.

In order to achieve the above objects, in accordance with a feature of the present invention, in an ATM communication apparatus which handles a fixed length packet, when a failure in a line or a connection accommodated in the communication apparatus is detected, AIS cells are inserted to upper level connections of the failure line or connection. Also the ATM communication apparatus, downward of the higher level connections, is provided with means for detecting the AIS cell.

In accordance with another feature of the present invention, first circuit means terminates a portion of the ATM communication line or the connection, inputs and output cells transmitted through a network, and detects the failure of the line or the connection, second circuit means prepares an AIS cell in response to the failure detection signal, and third circuit means detects both AIS cells, namely the AIS cell received from an external communication line and the internally prepared AIS cell.

In accordance with the present invention, the same process is conducted for the AIS cell prepared in response to the failure detection signal which is generated when the failure in the line or connection is detected and the AIS cell received by the first circuit from the external communication line. Namely, the process is the same for the two types of failure, that is, when the failure state of the VPs (upper level connections) accommodated in the failure line or connection of its own apparatus in the ATM-SW is detected and when the failure state of the VP is detected by receiving the VP-AIS cell (the AIS cell) generated by another apparatus when the transmission line fails.

Further, since the AIS cell is generated in response to the failure detection signal generated when the failure of the line or connection of its own apparatus is detected, the VP-AIS cell is continuously inputted to the VP failure detection circuit even if the transmission line failure occurs in its own apparatus when a VP is in the failed transmission line failure of the other apparatus. Accordingly, the present invention avoids the stop of supply of the VP-AIS cell and the improper release of the VP-AIS state.

DESCRIPTION OF THE PREFERRED EMBODIMENTS

1. Configuration

Figure 1:
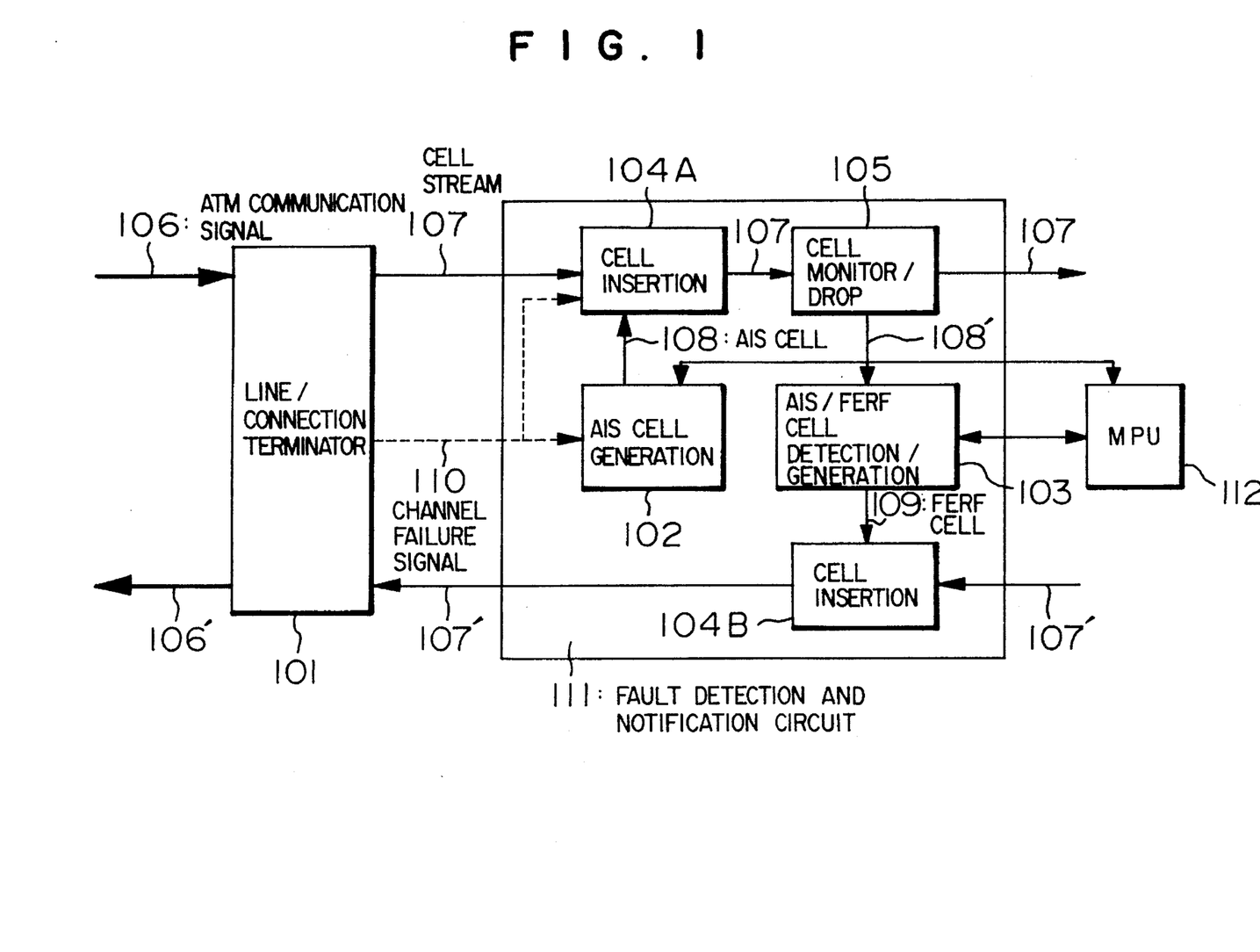
FIG. 1 shows a block diagram of a configuration of an ATM communication apparatus in accordance with the present invention.

FIG. 1 shows a configuration of an embodiment of a failure detection and notification circuit 111 for the ATM communication in accordance with the present invention.

An ATM communication apparatus usually accommodates a plurality of physical lines and has management sections for respective physical line. The failure detection and notification circuit 111 for the ATM communication shown in FIG. 1 is a part of the management section for each physical line of the ATM communication apparatus.

A line/connection end point 101 is an interface for the physical line and the ATM communication apparatus and it receives and sends an ATM transmission signal 106 and a cell stream 107 and outputs a channel failure signal 110 when it detects a line or connection failure. The failure is detected due to the drop of a signal power or a out-of-synchronization state, and the channel failure signal 110 is transmitted to the failure detection and notification circuit 111 through a signal line separate from the line for transmitting the cell.

An AIS cell generation circuit 102 supplies an AIS cell 108 to a cell insertion circuit 104A in response to the channel failure signal 110 so that the cell is inserted in a cell stream. The AIS cell 108 is copied or extracted by a monitor/drop unit 105 which is provided downward of the cell stream.

An AIS/FERF cell detection and generation unit 103 detects the AIS cell 108' copied or extracted by the monitor/drop unit 105 and determines the failure state. As may be required, the result of determination is transmitted to an MPU (microprocessor unit) 112 of the management section of each physical line of the ATM communication apparatus and it is further notified to a control unit of the ATM communication apparatus. The control unit may stop the charge at the exchange, disable the line and switch the VPs in accordance with the configuration of the ATM network and the failure state. The control unit may also control the AIS cell generation circuit 102 and the AIS/FERF cell detection and generation circuit 103 through the MPU 112. Further, the AIS/FERF cell detection and generation unit 103 generates the FERF cell 109 in response thereto and supplies it to the cell insertion unit 104B so that the FERF cell is inserted in the sending station cell stream.

Figure 2:
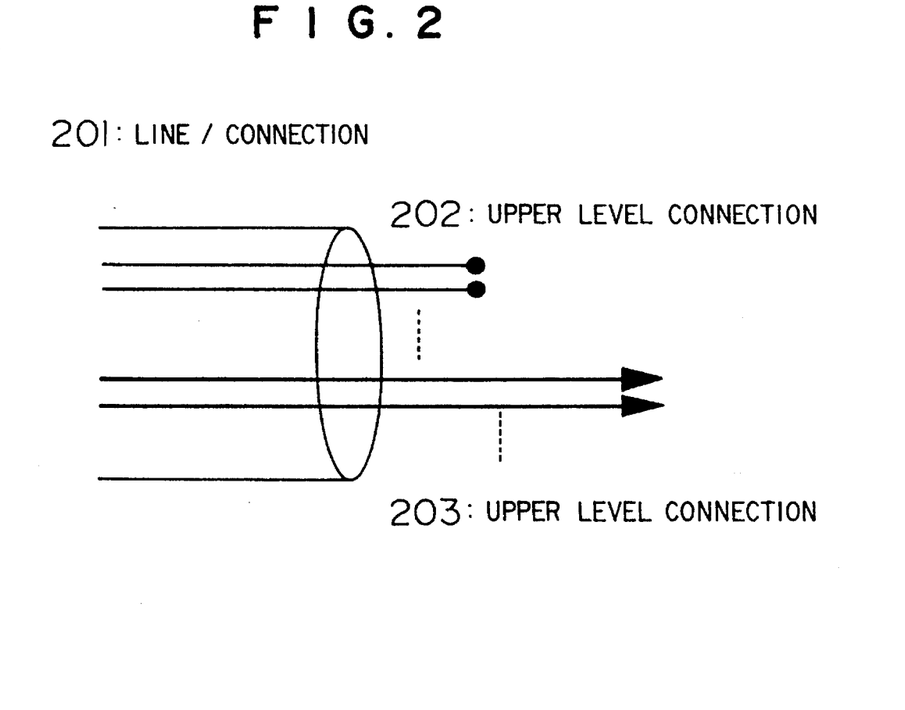
FIG. 2 shows a relation of a line or connection in a network handled by the apparatus of FIG. 1.

FIG. 2 shows a relation of the line or connection handled by the failure detection and notification circuit 111 of FIG. 1. The line/connection end point 101 detects the failure of the line or connection 201 terminated therein. The failure detection and notification circuit 111 of the present invention inserts an AIS cell in the cell stream to notify that upper level connections 202 and 203 accommodated therein are disabled for the communication. The AIS cell inserted in the upper level connection 202 terminated therein is extracted, and the AIS cell inserted in the second connection 203 which is not terminated therein is copied.

In FIGS. 1 and 2, the following specific configuration may be implemented. (1) The line 201 is a SDH line and the upper level connections 202 and 203 are VPs, and a line failure signal below a transmission convergence (TC) layer is transmitted as the channel failure signal 110. (2) The connections 201 is a VP, the upper level connections 202 and 203 are virtual circuits (VCs), and a VP failure signal is transmitted as the channel failure signal 110.

In either case, the failure detection and notification circuit 111 operates in the same manner.

2. Detailed construction and operation of the failure detection and notification circuit FIG. 4 shows a detailed construction of the failure detection and notification circuit of FIG. 1. An operation of the circuit is explained for a case where terminated VPs (VP-1 502 and VP-2 503) and non-terminated VPs (VP-3 504 and VP-4 505) are accommodated in an SDH line 501 as is the case of FIG. 3 and the SDH line of its own apparatus fails.

When the line failure signal 110 below the TC layer is received due to the failure in the SDH line of its own apparatus, a table accessing unit 604 accesses to a VP table-1 606 (signal S2) to acquire the AIS cell generation information. The VP table-1 606 is looked up by the VPI content as the memory address and contains generation period information 608 which determines a period to generate the AIS cell for each VPI and a VP enable/disable bit 609 which indicates whether the VP is actually active or not. The memory address is managed by an address increment timer 605 which increments the address by one at a predetermined interval so the information of all VPs accommodated in the failure SDH line are cyclically read by the table accessing unit 604. The VPI data read from the table 606 is utilized in the following manner to generate and determine the AIS cell. When the VP enable/disable bit 609 is "enable" and the generation decision unit 610 determines that it is a time to generate the AIS cell from the generation period information 608, the signal S1 is inputted to the AIS cell generation unit 603 and the AIS cell is generated.

Figure 3:
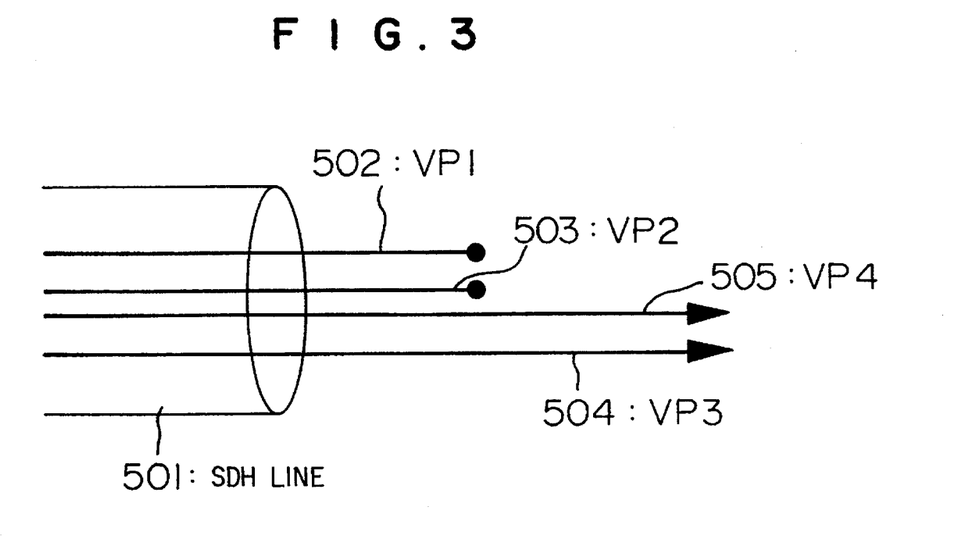
FIG. 3 shows an example of a network comprising synchronous digital hierarchy (SDH) lines and VP connections.
Figure 4:
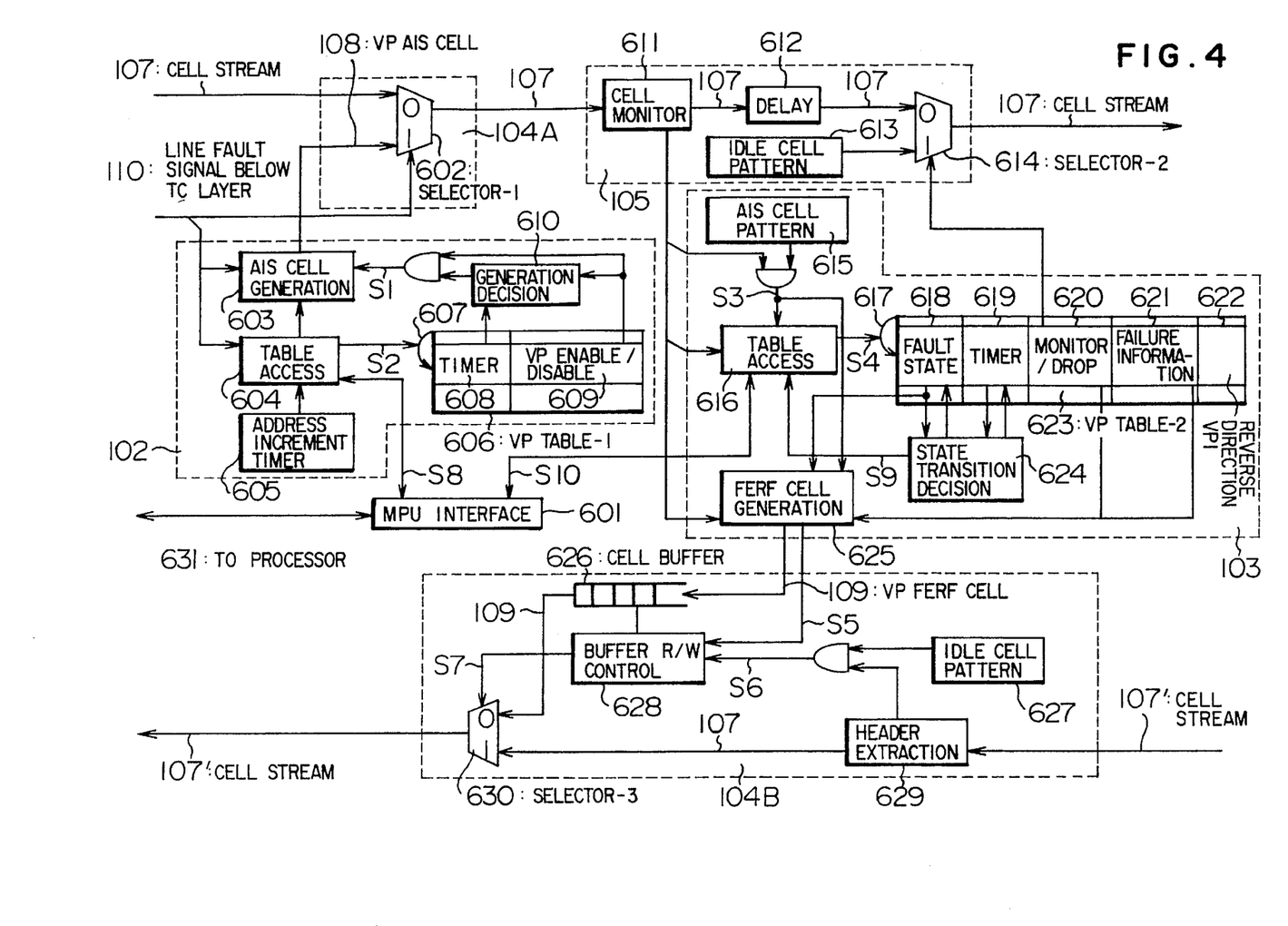
FIG. 4 shows a detailed configuration of the communication apparatus of FIG. 1.
Figure 5A:
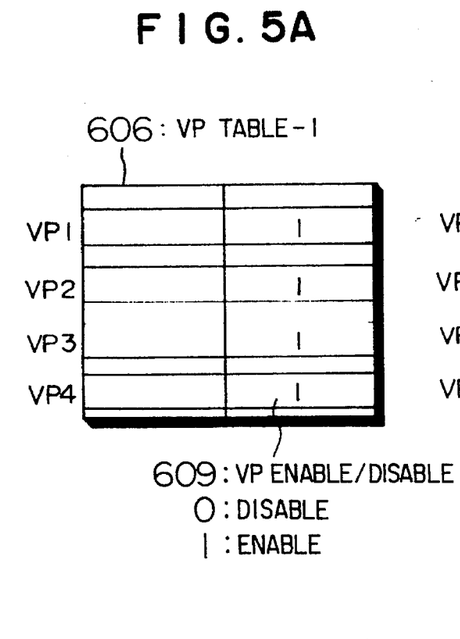
FIG. 5A shows a main part of a first VP table 606 in FIG. 4.

In the example shown in FIG. 3, since VP1, VP2, VP3 and VP4 are enabled, the VP enable/disable bit 609 is "enable" (=1) in the VPI data at each of the address positions corresponding to VP1, VP2, VP3 and VP4 as shown in FIG. 5A. Accordingly, the AIS cells 108 are generated for those VP1, VP2, VP3 and VP4.

Figure 6A:
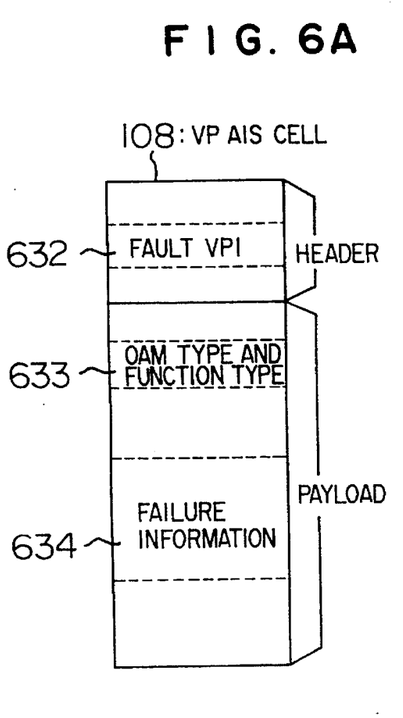
FIG. 6A shows a main part of an AIS cell 108.

As shown in FIG. 6A, VPI values indicating VP1, VP2, VP3 and VP4 are set in a failed VPI field 632 of a header, respectively. A code indicating that the cell is the AIS cell is set in an OAM type and function type field 633 in the payload and the information indicating the content of the failure generated based on the line failure signal 110 and of the location ID indicating the location of the failure is set in a failure information field 634.

When the line fails, the cell stream 107 is not received and a selector-1 602 provided on a path of the cells 107 is set to "1" (AIS cell input side) by the failure signal 110 and the VP-AIS cell 108 generated by the cell generation unit 603 is inserted to the cell stream 107.

Each cell outputted from the selector 602 is supplied to the downward cell monitor unit 611 and the content of the OAM type and function type fields 633 copied thereby is compared with the AIS cell code stored in an AIS cell pattern memory 615. If the input cell is the AIS cell, a match signal S3 is outputted and a signal S4 is sent out to enable the table accessing unit 616 to access to a VP table-2 623.

Figure 5B:
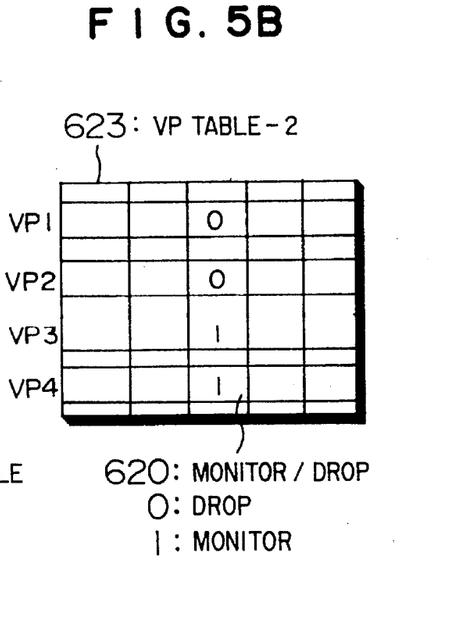
FIG. 5B shows a main part of a second VP table 623.

The VP table-2 623 includes a data record including failure state 618, state management timer 619, monitor/drop bit 620, failure information 621 and reverse direction VPI 622 at each memory location having the VPI value as the address 617. The monitor/drop bit 620 is determined by the type of termination of the VP. In the example shown in FIG. 3, the monitor/drop bit 620 is set such that the "drop" is selected for the VP1 and the VP2 since they are terminated therein and the "monitor" is selected for VP3 and the VP4 which are not terminated therein. Namely, the VP table-2 623 has the monitor/drop bits 620 at the address positions corresponding to the VP1 and VP2 set to the drop state ("0" in this example) and the monitor/drop bits 620 at the address positions corresponding to the VP3 and the VP4 set to the monitor state ("1"), as shown in FIG. 5B.

In the above data record, when the monitor/drop bit 620 indicates the drop state, the selector-2 614 on the cell path 107 is controlled to select the "1" side and an idle cell outputted from an idle cell pattern generator 613 is inserted in a position matching to an copied cell arrival time point adjusted by a delay circuit 612. When the monitor/drop bit 620 indicates the "monitor", the selector-2 614 is controlled to select the "0" side to pass the copied cell.

Namely, for the non-terminated VP, the cell stream 107 having the AIS cell inserted therein is outputted from the selector-2 614. On the other hand, for the terminated VP, the cell stream 107 having the idle cell inserted therein is outputted from the selector-2 614.

Of the contents of the VP table-2 623, the failure state 618 and the timer 619 correspond to the state and the VP-AIS cell non-reception timer shown in FIG. 8 and they are supplied to a state transition decision unit 624 and values updated in accordance with the state transition diagram of FIG. 8 are written onto the VP table 623. When the state is changed to the failure state or the failure state is recovered to the normal state by the decision of the state transition decision unit 624 and the notification to the host processor is required, the failure notification signal is supplied to the table accessing unit 616 by a signal S9 and it is notified to an MPU interface 601 through the table accessing unit 616 and to the host processor through the signal line 631.

Figure 6B:
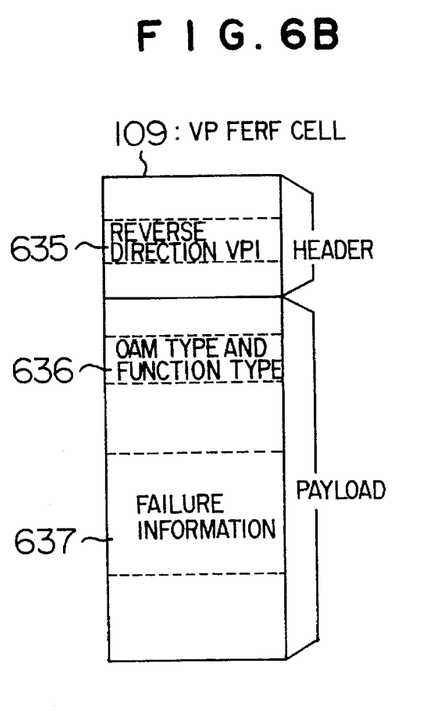
FIG. 6B shows a main part of a FERF cell 109.

When the monitor/drop bit 620 is "drop", the FERF cell generation unit 625 generates the FERF cell 109. The FERF cell 109 has the reverse direction VPI values of the VP1 and the VP2 set in the reverse direction VPI field 635 of the header, a code indicating that the cell is the FERF cell set in the OAM type and function type field 636 of the payload, and information generated based on the AIS cell set in the failure information field 637, as shown in FIG. 6B.

The VP-FERF cell 109 is temporarily stored in a cell buffer 626 of the cell insertion unit 104B. It is notified by the signal S5 from the FERF cell generation unit 625 to a buffer R/W control unit 638.

The cell insertion unit 104B has a header extraction unit 629 on sending cell stream 107', and the cell header copied from the cell stream 107' and the idle cell pattern outputted from the idle cell pattern generator 627 are compared to detect the idle cell on the sending cell stream 107'. When the idle cell is detected, the idle cell signal S6 is supplied to the buffer R/W control unit 628, which, when receives the signal S6 in addition to the signal S5, sequentially reads the VP FERF cells 109 from the top of the cell buffer 626. A selector-3 630 is controlled to select "0" to select the output of the cell buffer 628 at the timing that the idle cell in the sending cell stream is detected so that the FERF cell 109 is inserted in the sending cell stream.

The host processor may access to the VP table-1 606 and the VP table-2 623 through the MPU interface 601 so that the data in the tables may be updated.

When the SDH line in the other apparatus fails, the selector 602 is in the "0" position (cell stream position) and the VP AIS cell is supplied with the other cells. The operation after the cell monitor unit 611 is same as that of the case where the failure cell is generated by the line failure of its own apparatus.

3. Modification

In the embodiment, the AIS cell is prepared when the line failure signal is received. Alternatively, a different type of cell may be prepared. Similarly, a different type of cell then the FERF cell may be prepared for the alarm indication through a connection of reverse direction.

4. Technical Advantages

In accordance with the present invention, the same process is conducted to the AIS cell prepared in response to the failure detection signal which is generated when the failure in the line or connection is detected and the AIS cell received from the external communication line. That is, the process is the same for the case where the failure state of the VP (upper level connection) accommodated in the failure line or connection of its own apparatus in the ATM-SW and the case where the failure state of the VP is detected by receiving the VP-AIS cell generated by the other apparatus when the transmission line fails.

Further, since the AIS cell is generated in response to the failure detection signal generated when the failure of the line or connection of its own apparatus is detected, the VP-AIS cell is continuously inputted to the VP failure detection circuit even if the transmission line failure occurs in its own apparatus in addition the VP is in failure status by the failure of the other apparatus. Accordingly, the present invention avoids the stop of supply of the VP-AIS cell and the improper release of the VP-AIS state.

What is claimed is:

1. A failure detection and notification apparatus comprising:

a first circuit for terminating a portion of an asynchronous transfer mode (ATM) communication line or connection, inputting and outputting cells, and outputting a failure detection signal when a failure is detected in said line or connection;

a second circuit for receiving the failure detection signal supplied from said first circuit to generate an alarm indication signal (AIS) cell and inserting said AIS cell in a received cell stream outputted from said first circuit; and a third circuit arranged downstream of the received cell stream having said AIS cell inserted therein for generating a far end receive failure (FERF) cell when the AIS cell is detected and inserting said FERF cell in a sending cell stream, wherein said first circuit terminates said line or connection accommodating upper level connections and generates said failure detection signal when the failure is detected in said line or connection, and said third circuit performs the same process in response to any one of said AIS cell generated by said second circuit and an AIS cell received by said first circuit from external of said apparatus.

2. A failure detection and notification apparatus according to claim 1, wherein said third circuit includes a fourth circuit for extracting cells or copying cells from the received cell stream outputted from said second circuit, a fifth circuit for detecting the AIS cell from the extracted or copied cells and generating FERF cells, and sixth circuit for inserting the FERF cells in idle cell positions of the sending cell stream and supplying the sending cell stream to said first circuit.

3. A failure detection and notification apparatus according to claim 1, wherein said third circuit performs extraction with respect to the AIS cells on said upper level connections terminated by said first circuit, and performs copying with respect to the AIS cells on a connection not terminated by said first circuit.

4. A failure detection and notification apparatus according to claim 2, wherein said third circuit performs the extraction with respect to the AIS cells on said upper level connections terminated by said first circuit, and performs the copying with respect to the AIS cells on a connection not terminated by said first circuit.

5. A failure detection and notification circuit according to claim 1, wherein said line or connection is a line below a transmission convergence (TC) layer of a synchronous digital hierarchy (SDH) circuit defined by CCITT G.782, and said upper level connections are virtual path (VP) connections.

6. A failure detection and notification apparatus according to claim 1, wherein said line or connection is a VP connection, and said upper level connections are virtual channel (VC) connections.

* * * * *